Dec. 15, 1970

NOBORU MURAYAMA 3,548,376

MATRIX COLLATING SYSTEM

Filed June 16, 1966

INVENTOR
Noboru Murayama
BY
Burgess, Ryan & Hicks 3,548,376

MATRIX COLLATING SYSTEM

Noboru Murayama, Tokyo, Japan, assignor to Kabushiki Kaisha Ricoh, Tokyo, Japan, a corporation of Japan Filed June 16, 1966, Ser. No. 558,056
Int. Cl. H03k *13/34*
U.S. Cl. 340—146.1 12 Claims

ABSTRACT OF THE DISCLOSURE

A system for determining whether two sets of electrical signals are related to each other by a predetermined code and more particularly an apparatus for converting a first set of signals to a second set of signals including a diode matrix having first and second sets of input and output terminals for receiving the two signals to be compared and means connected to the input and output terminals for sensing the electrical condition of the matrix so that correspondence and non-correspondence between the two sets of signals produces a suitable indication.

At any particular instant in a digital computer logic system a great deal of information is stored in the computer memory and control units. In addition some word or a few words will be in transit from one place to another or are being converted from one code to another, such as a conversion from a Gray code to an Excess-3 code. Transfers and conversions of this kind present both an opportunity for circuits to fail and an opportunity for error checks to be made on the information being transferred or converted. It is well known in the digital computer art to check errors of transmission by a parity check system which utilizes an odd or even characteristic of a code. It is also known that digital code errors can be checked by an all-bit comparison or collating system in which the same code is transmitted twice and any discrepancy which arises in the comparison can then be noted.

This invention generally relates to an error checking system for digital codes. It specifically employs a selection matrix of diodes which can render a result with the same degree of precision as that of an all-bit comparison system without the need of comparing or collating all of the bits. Furthermore, the comparison system disclosed by this invention provides an extremely effective method of error checking when code conversion, or in particular, a code inversion-conversion, is required.

The primary object of this system is to provide a comparison or a collating error checking system which results in precise error check without the undue burden of comparing all of the bits being transmitted.

Other and obvious objects of this invention will be ascertained from the full description of the operative capabilities of the system which is hereafter fully described.

Figures 2, 2A, 2B:
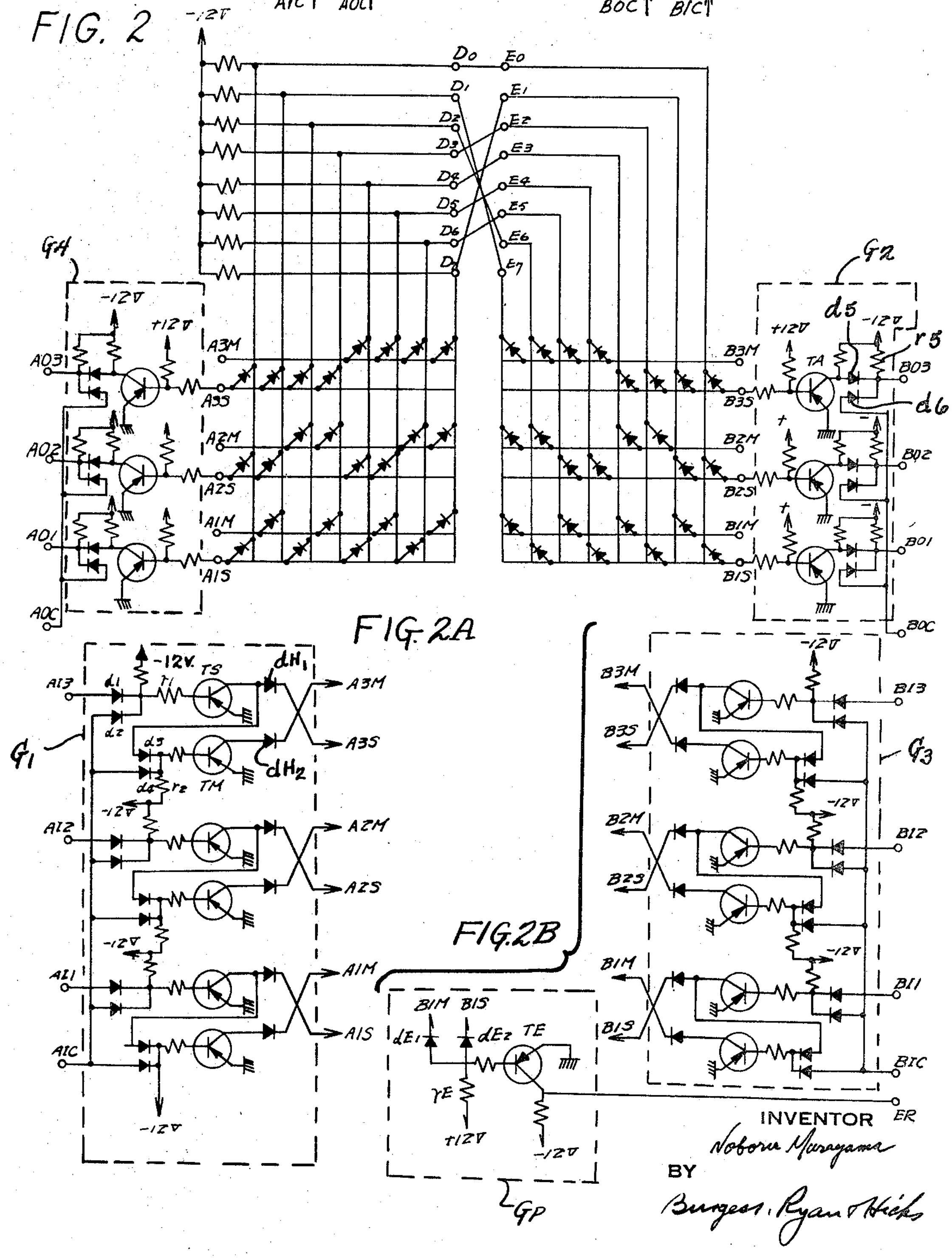
FIG. 2 shows a detailed schematic arrangement of the matrix of FIG. 1 together with the output gates G2 and G4.

FIG. 2*a* shows a detail schematic representation of the input gate G1.

FIG. 2*b* shows a detailed schematic representation of the input gate G3 and the gate GP.

Figure 1:
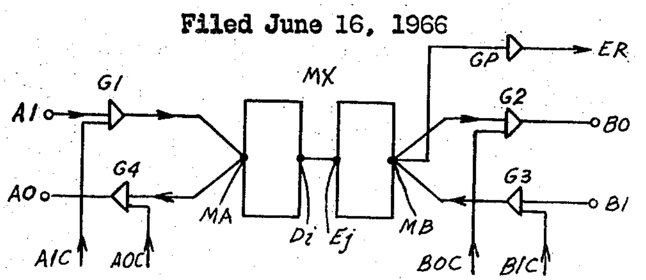
FIG. 1 is a block representation of the subject invention.

Referring specifically to FIG. 1, it represents an error checking system, which may be connected in parallel to a digital converter unit, capable of converting from one code A to another code B, or vice versa. AI represents an input terminal for a code A system, such as a Gray code, and AO represents an output terminal for the same A system. The signals from these terminals are operated upon in that particular area of the digital computer system using the A code for its operations. Likewise, BI represents an input terminal for a code B system, such as an Excess-3 code, and BO represents an output terminal for the same code B system. The signals from these terminals are operated upon in the particular digital computing area which uses the B code. MX represents a matrix arrangement which can be composed of a one-sided diode arrangement; however, it is not so limited. In practice, it is usually composed of a two-sided matrix. MA represents an input and output terminal on the A side of the matrix and MB is the similar terminal on the B side thereof. $G_1$, $G_2$, $G_3$ and $G_4$ represent logic AND gate circuits provided between the above referred to inputs and outputs of the matrix and the inputs and outputs AI, AO, BI, and BO. AIC, AOC, BOC and BIC represent the input control terminals for the logic AND gate circuits. GP represents an error detection circuit and ER represents the output signal generated by this error checking system.

The operation of the error checking system will now be described. Assuming a conversion from an A code system to a B code system to be represented as $A \rightarrow B$, and reverse conversion $B \rightarrow A$ and letting "$n$" represent the bits of individual codes, a Code A systems and code B systems can be identified as Ci(A) and Cj(B) ($i, j = 1, 2, 3 \ldots$). The above described matrix performs a conversion from A to B and B to A, in which correspondence of C$i$(A) with C$j$(B) is determined by connection between "$n$" number of terminals D$i$ corresponding to the C$i$(A) and equal number of E$j$ terminals corresponding to the C$j$(B). Assuming a code C$i$(A) is provided at the input of the matrix at terminal MA from input terminal AI of the code A system through the logic AND gate circuit $G_1$, the corresponding terminal D$i$ alone will be enabled to the "1" state leaving all the other terminals D$k$ ($k$ unequal to $i$) at the "0" state. The terminals D$i$ and E$j$ of matrix MX are connected so that a code C$j$(B) corresponding to the terminal E$j$ is obtained at the output terminal BO, from the output terminal MB of the matrix MX through the logic AND gate circuit $G_2$. Under these conditions, because all the terminals D$k$ within the matrix are combined respectively with all the terminals E$m$, ($m$ unequal to $j$), the terminals E$m$ must indicate a "0" state. The particular connection of the D and E terminals is predetermined by the code conversion which is desired to be made.

Assuming that the matrix MX is left in the above described state and an echo code corresponding to C$j$(B) is placed in the input terminal MB from input terminal BI of code system B through the logic AND gate $G_3$. The terminal E$j$ will then indicate a "1" because of the input of code C$j$(B) into the matrix through MB while the remaining terminals E$m$ indicate "0" causing the matrix MX to disclose an identical state as though a code C$i$(A) were placed at the input terminal MA on the A side of the matrix. On the other hand, if a code C$i$(A) were placed in the input terminal of MA while providing the input terminal of MB with a code $Cj$(B) the latter not corresponding to the $Ci$(A) code ($i$ unequal to $j$) the terminal D$i$ will be in the "1" state reducing the remaining terminals to "0" state. This will also subsequently turn the terminal E$j$ to "1" because of the connection previously established between terminals D$i$ and E$j$ within the matrix.

Because the matrix has the characteristic of indicating a "0" state in case a "0" and a "1" state are overlapped, the voltage on each of the terminals E$i$ and D$j$ ($i$, $j$ equal to 1, 2, 3 . . . ) is reduced to a "0" state indication whenever an overlap occurs. This also reduces to a "0" state indication the input and output terminals MA and MB of the matrix MX.

The terminals MA and MB are composed of mark terminals and space terminals depending on the number of bits "$n$" on the codes $Ci$(A) and $Cj$(B) and on both mark and space terminals becoming "0" at the same time.

An arbitrary check can then be made on the code being transmitted. The error detecting circuit GP can check a simultaneous entry of "0" by any mark and space terminal and it is therefore capable of detecting an overlapping of uncorresponding code between the MA and MB input and outputs of the matrix MX. This can also be accomplished with an inversion-conversion operation.

FIG. 2, in conjunction with FIGS. 2A and 2B, discloses a particular embodiment of the invention, for purposes of clarity and description and should not be considered limiting. A three-bit one-selection diode matrix is used for convenience in place of an eight-bit double selection matrix which is generally used in practice. It must be understood that the former is shown to merely facilitate the presentation of the subject invention. FIG. 2A details a three-bit exemplary embodiment of gate $G_1$, and FIG. 2B shows the details of an exemplary embodiment of gates $G_3$ and $G_p$.

A three-bit input gate or register $G_1$ using the $Ci$(A) code is connected in FIG. 2A to the input terminals $AI_1$, $AI_2$, and $AI_3$. The "1" state in this embodiment is represented by a $-12$ volt condition on a line and a "0" state is represented by 0 volt thereon. The input circuit connected to terminal $AI_3$ is composed of diodes $d_1$, $d_2$ and resistor $r_1$, which when considered together with the input control terminal AIC, constitutes a logic AND gate circuit. If an output is emitted from this AND gate, it becomes the input to transistor TS upon the base terminal thereof. The transistor TS inverts the phase of the signal received on its base and enters it as an output on its collector terminal as an inverted signal of the base input. This output is applied through diode $dH_1$ to terminal A3S in FIGS. 2A and 2. In addition the collector output of transistor TS is again inverted through transistor TM. This transistor is connected on the output terminal of an AND gate composed of diodes $d_3$, $d_4$ and resistor $r_2$. One of the inputs to this logic AND circuit is the control signal from terminal AIC. By this circuit arrangement, the following phase relationship is achieved. The output of transistor TS at terminal A3S and the input at $AI_3$ are in opposite phase, while the output of transistor TM at terminal A3M (via diode $dH_2$) is of the same phase as the input of $AI_3$.

Terminal $A_3M$ in FIGS. 2 and 2A may be referred to as the "mark" terminals, while those designated $A_3S$ may be called the "space" terminals.

Terminals $AI_2$ and $AI_1$ in FIG. 2A are connected to the same type of logic circuit arrangement as the terminal $AI_3$. This type of a logic circuit arrangement gives an output at each of the mark terminals $A_3M$, $A_2M$ and $A_1M$ and at each of the space terminals $A_3S$, $A_2S$ and $A_1S$, when the input control terminal AIC is "1." For example, assuming that an input pulse of 1, 1, 1 is entered at the terminals $AI_1$, $AI_2$ and $AI_3$ while a "1" is simultaneously entered at the control terminal AIC, the resulting output at the mark input terminals $A_1M$, $A_2M$ and $A_3M$ on the A side of the diode matrix be a "1" while the space terminal on the same side of the diode matrix, that is on the A side. will be at "0." This places terminal $D_7$ of the matrix at the "1" state since all three of the mark terminals are diode connected to terminal $D_7$. The remaining matrix terminals $D_0$ through $D_6$ will be in the "0" state, because each is diode connected to at least one space terminal which is grounded through the respective conducting transistor at the input, causing all matrix terminals $D_0$–$D_6$ to be at zero volts.

With the two diode matrices interconnected in the exemplary manner shown, the "1" on terminal $D_7$ is transferred to terminal $E_1$, which is diode connected only to terminals $B_3S$, $B_2S$, and $B_1M$. This state of the diode matrix results in the mark terminals on the B side of the matrix indicating a 0, 0, 1 code whereas that of the space terminals conversely indicate a 1, 1, 0 code. The phase or "1" state of the above input pulse entered on space terminal $B_3S$ is reversed by transistor TA, and it becomes a "0" output which is transmitted to a logic AND gate circuit composed of diodes $D_5$, $D_6$ and resistor $r_5$. An output results at $B0_3$ when an output control pulse is provided at the input control terminal B0C on the B side of the matrix. Similar operations are made for the input pulses placed on space terminals $B_2S$ and $B_1S$.

If an input control pulse "1" is placed at input control terminal B0C, the truth table for output terminals $B0_3$, $B0_2$ and $B0_1$ gives a coded output of 0, 0, 1 which means that a code of 0, 0, 1 is obtained in the $C_1$(B) code of the $Cj$(B) system corresponding to a 1, 1, 1 coded output of the $C_7$(A) code of the $Ci$(A) system as explained in relation to FIG. 1.

Reference is now made to gate $G_3$ in FIG. 2B which gate is similar in all respects to gate $G_1$ of FIG. 2A, except its mark and space output terminals connect to matrix side B at correspondingly designated terminals. Gate $G_3$ is used for code checking purposes.

By entering an input control signal of "1" at terminal I in gate $G_3$ (FIG. 2B) on the B side of the matrix and entering into that gate the $C_1$(B) code resulting from gate $G_2$ (i.e., 0, 0, 1 at input terminals $BI_3$, $BI_2$, and $BI_1$), the encoding into a $Cj$(B) code of the above $Ci$(A) code is overlapped at the matrix input and output terminals $B_1S$, $B_1M$ through $B_3S$, $B_3M$ on the B side. This is true because an 0, 0, 1 input to gate $G_3$ results in only terminals $B_3S$, $B_2S$ and $B_1M$ being at "1," it will be recalled that these same terminals were at "1" in the transmission of the code from the A side to the B side. Consequently, the voltage level of terminals $E_1$ and $D_7$ remains near $-12$ volts, i.e., at "1." The other matrix terminals $E_0$, $E_2$–$E_7$ and $D_0$–$D_6$ remain at the "0" state. These conditions of the E and D terminals cause gate $G_4$ to effect an output of 1, 1, 1 at terminals $A0_3$, $A0_2$, $A0_1$ when an input pulse of "1" is applied to control terminal A0C. Since gate $G_4$ provides the same output as the input applied to gate $G_1$, the original signals were transmitted without error.

Assuming that an encoded signal other than the 0, 0, 1 is applied at the input terminals $BI_3$, $BI_2$ and $BI_1$, a different result is achieved. For example, if a 0, 0, 0 code is applied at the gate input terminals $BI_3$, $BI_2$ and $BI_1$, matrix input terminals $B_3S$, $B_2S$, $B_1S$ would be at "1," which should cause terminal $E_0$ to be at "1" reducing the other terminals $E_1$ through $E_7$ to a "0." However, terminal $D_0$ on the A side of the matrix is at "0" because of the 1, 1, 1 code applied at the input terminals $AI_3$, $AI_2$ and $AI_1$. Because a "0" state will override a "1" state, terminal $E_0$ which is connected to terminal $D_0$ also results in a "0" state. In like manner, the "0" condition of terminal $E_1$ caused by the 0, 0, 0 signal to terminals $BI_3$, $BI_2$, $BI_1$, causes terminal $D_7$ to be in the "0" state also.

In other words, terminals $D_0$ through $D_7$ and $E_0$ through $E_7$ within the matrix are all reduced to the "0" state indicating that if codes A and B do not correspond with each other, all of the memory interconnections are registering a "0" state, which reduces all of the mark and space terminals on both the A and B sides of the matrix to the "0" state. The mark and space terminals connected to the $D_0$ through $D_7$ and $E_0$ through $E_7$ terminals of the matrix, are at the "0" level and simultaneously register a "0" state level, only when all of the terminals $D_0$ through $D_7$ and $E_0$ through $E_7$ are at the "0" level. Outputs at $A0_3$, $B0_3$ through $A0_1$, $B0_1$ are all "0" when the A and B codes do not correspond. While time coincidence of aplying the input signals $AI_3$, $AI_2$, AI, and $BI_3$, $BI_2$, BI to the respective matrices is not basically necessary, it may be assured when the two gating control signals AIC and BIC are simultaneously timed. This assures that they will be on or off at the same time so that the comparison determination of the related input code signals will be effectuated and any false comparison signal posibility will be eliminated.

From this logic arrangement an erroneous code transmission can be checked by providing a detection circuit $G_p$ (see FIGS. 1 and 2B) composed of diodes $dE_1$ and $dE_2$, resistor $rE$ and a transistor TE. This detection circuit constitutes a NOT AND circuit, which has an output of "1" at its ER terminal only when both input terminals BIM and BIS are at the "0" level. Since this is a condition which never happens for any pair of mark and space terminals unless there is an error in the A and B codes, a simple accurate error detector is provided.

The error detection circuit described above is of course, applicable not only to the specific terminal combination of BIM and BIS as described, but also to any other pair of mark and space terminals on either side of the matrix.

As hereinabove described, when a matrix is employed in an A to B conversion, detection of conversion errors can be precisely determined by overlapping the encoding comparison codes from the B side of the matrix which is also logically applicable to the identical comparison from the B to A side thereby allowing the detection of errors in an inversion comparison system.

The foregoing construction and advantages of this error checking system are readily apparent. Numerous modifications will readily occur to those skilled in the art, after a consideration of the specification and accompanying drawings. It is not intended to limit the invention to the precise embodiment shown and described, but all suitable modifications and equivalents may be readily resorted to if desired.

What is claimed is:

1. A system for determining whether two sets of electrical signals are related to each other by a predetermined code, comprising;

matrix means having first and second sets of input and first and second sets of output terminals for respectively receiving said two signals to effect comparison therebetween, said matrix being internally interconnected in accordance with said predetermined code, and means connected to one of said input and connected to one of said output terminals for sensing the electrical condition of said matrix means as between at least two different conditions, to indicate correspondence and non-correspondence between said sets of signals.

2. A system as in claim 1 including:

plurality of gating means connected to said first and second input and output terminals of said matrix means for respectively impressing said two signals upon said matrix means for effecting comparison therebetween.

3. A system as in claim 1 wherein said means connected to one of said input terminals and connected to one of said output terminals for sensing the electrical condition of said matrix means indicates non-correspondence between said sets of signals only when both said sets are in a "0" logical condition.

4. A system as in claim 3 wherein said means for sensing the electrical condition of said matrix consists of a NOT AND logic circuit.

5. A system as in claim 2 wherein said plurality of gating means includes of AND logic circuits.

6. A system for determining whether two sets of electrical digital signals are related to each other by a predetermined code, each of said sets including a plurality of complementary signal pairs, comprising:

first matrix means having a plurality of pairs of input terminals for receiving one of said sets of signals pair-to-pair, second matrix means having a plurality of pairs of input terminals for receiving the other of said set of signals pair-to-pair, means interconnecting said first and second matrix means at their outputs in accordance with said code to cause at least one pair of terminals of at least one of said matrix means to be in a given electrical condition only if said two sets of signals are not actually related by said code, and error detector means connected to said one pair of input terminals for sensing said electrical condition when it occurs and then indicating non-correspondence between said input signals.

7. A system as in claim 6 including:

first plurality of gating means connected to said plurality of pairs of input terminals of said first matrix means, for impressing a first set of electrical digital signals upon said first matrix means, and second plurality of gating means connected to said plurality of pairs of input terminals of said second matrix means, for impressing a second set of electrical digital signals upon said second matrix means.

8. A system as in claim 6 wherein said error detector means for sensing said electrical condition indicate non-correspondence between said input signals only when both are in a "0" logical condition.

9. A system as in claim 6 wherein said error detector means consists of a NOT AND logic circuit.

10. A system as in claim 7 wherein said first and second plurality of gating means consists of AND logic circuits.

11. Apparatus for converting a first set of electrical signals in a first code into a second set of electrical signals in a second code comprising:

input terminal means for receiving said first set of signals, matrix code converting means connected to said input terminal means for converting said first set of signals in said first code into said second set of signals in said second code, matrix code reconverting means for reconverting said second set of signals in said second code into a third set of signals in said first code, and means for comparing at least one signal of said third set of signals and the complement of said one signal and producing an error signal if said one signal and said complement of one signal do not correspond.

12. Apparatus for converting a first set of electrical signals in a first code into a second set of electrical signals in a second code comprising:

input terminal means for receiving said first set of signals, code converting means connected to said input terminal means for converting said first set of signals in said first code into said second set of signals in said second code, code reconverting means for reconverting said second set of signals in said second code into a third set of signals in said first code, and means for comparing at least one signal of said third set of signals and the complement of said one signal, producing an error signal if said one signal and said complement of one signal do not correspond and causing said first, second and third sets of signals to assume a uniform state when said first and third sets do not correspond.

References Cited

UNITED STATES PATENTS

| | | | |
|---|---|---|---|
| 2,959,775 | 12/1960 | Marcus | 340—347 |
| 3,395,389 | 7/1968 | Zartoshti | 340—146.1 |
| 2,926,334 | 2/1960 | Abbott, Jr. | 235—153X |
| 3,297,986 | 1/1967 | Reardon | 340—146.2 |
| 3,364,468 | 1/1968 | Haibt et al. | 340—166X |
| 3,371,315 | 2/1968 | Huffman et al. | 340—347 |
| 3,427,585 | 2/1969 | Milford | 235—153X |

MALCOLM A. MORRISON, Primary Examiner

R. S. DILDINE, JR., Assistant Examiner

U.S. Cl. X.R.

235—154; 340—347, 166, 146.2; 235—153